(12) United States Patent
Kimura

(10) Patent No.: US 11,919,090 B2
(45) Date of Patent: Mar. 5, 2024

(54) WELD BEAD CUTTING DEVICE

(71) Applicant: TOYOTA JIDOSHA KABUSHIKI KAISHA, Toyota (JP)

(72) Inventor: Miki Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1093 days.

(21) Appl. No.: 16/592,149

(22) Filed: Oct. 3, 2019

(65) Prior Publication Data

US 2020/0139447 A1 May 7, 2020

(30) Foreign Application Priority Data

Nov. 2, 2018 (JP) ................................. 2018-207058

(51) Int. Cl.
| | |
|---|---|
| B23B 1/00 | (2006.01) |
| B29C 65/00 | (2006.01) |
| B29K 307/04 | (2006.01) |
| B29K 663/00 | (2006.01) |

(52) U.S. Cl.
CPC ............ *B23B 1/00* (2013.01); *B29C 66/0326* (2013.01); *B29C 66/7212* (2013.01); *B23B 2215/72* (2013.01); *B29K 2307/04* (2013.01); *B29K 2663/00* (2013.01)

(58) Field of Classification Search
CPC . B29C 66/0326; B29C 66/7212; B29C 37/04; B29K 2307/04; B29K 2663/00; B23B 2215/72; B23B 2220/08; B23B 2260/116; B23C 3/04
See application file for complete search history.

(56) References Cited

U.S. PATENT DOCUMENTS

| | | | | |
|---|---|---|---|---|
| 7,988,029 | B2* | 8/2011 | Gleason ................. | B23D 1/003 |
| | | | | 228/125 |
| 8,297,157 | B1* | 10/2012 | Miller ..................... | B23C 3/007 |
| | | | | 408/211 |
| 2002/0088806 | A1 | 7/2002 | Takaku et al. | |
| 2012/0073132 | A1* | 3/2012 | Sugitani .................. | C21D 9/50 |
| | | | | 83/861 |
| 2015/0258613 | A1* | 9/2015 | Choi ....................... | B23C 3/122 |
| | | | | 82/1.11 |

(Continued)

FOREIGN PATENT DOCUMENTS

| | | |
|---|---|---|
| CN | 106216753 A | 12/2016 |
| DE | 1 269 002 A | 5/1968 |
| DE | 82 027 B1 | 8/1973 |

(Continued)

OTHER PUBLICATIONS

English translation of Office Action dated Apr. 19, 2023, in German Application No. 102019125757.3.

*Primary Examiner* — Sara Addisu
(74) *Attorney, Agent, or Firm* — Sughrue Mion, PLLC

(57) ABSTRACT

A weld bead cutting device is configured such that, a liner made as liner portions are abutted on and welded to each other is rotated around a rotation axis extending in a direction along an abutting direction, and a weld bead is cut with a cutting tool arranged among rollers in a state where the rollers are pressed against an outer peripheral surface of the liner, the rollers being arranged on both sides of the weld bead on the liner in a direction along an extending direction of the rotation axis.

2 Claims, 8 Drawing Sheets

(56) References Cited

U.S. PATENT DOCUMENTS

2021/0170512 A1\* 6/2021 Kimura .................... B23B 5/36
2021/0394318 A1\* 12/2021 Segawa ................ B23P 19/047

FOREIGN PATENT DOCUMENTS

| JP | 08-141838 A | 6/1996 |
|----|-------------|--------|
| JP | 2002-188794 A | 7/2002 |
| JP | 2008-23558 A | 2/2008 |
| JP | 2013-176975 A | 9/2013 |

\* cited by examiner

WELD BEAD CUTTING DEVICE

INCORPORATION BY REFERENCE

The disclosure of Japanese Patent Application No. 2018-207058 filed on Nov. 2, 2018 including the specification, drawings and abstract is incorporated herein by reference in its entirety.

BACKGROUND

1. Technical Field

The disclosure relates to a weld bead cutting device and a weld bead cutting method.

2. Description of Related Art

Conventionally, as disclosed in Japanese Unexamined Patent Application Publication No. 2002-188794 (JP 2002-188794 A), a liner (a pressure container made of resin) is fabricated as a plurality of resin members (resin molded articles) are joined to each other by welding. JP 2002-188794 A discloses that the liner is fabricated as an open-side end edge of each of a plurality of resin liner portions molded into an almost cylindrical shape is heated and melted, and then the end edges of the liner portions are abutted on and welded to each other. Further, a reinforcing portion (referred to as a shell in JP 2002-188794 A) is provided as, for example, carbon fiber is wound around an outer circumference of the liner so that strength is ensured.

When the liner is fabricated, a weld bead is generated on an outer circumference of a welding portion between the liner portions. The weld bead can be a cause of breakage of the carbon fiber when the carbon fiber is wound around the outer circumference of the liner. Further, when there is the weld bead, a gap is made between the outer peripheral surface of the liner and the carbon fiber, and strength of a tank (a tank that is structured as the reinforcing portion is provided on the outer circumference of the liner) can be adversely affected.

Thus, on a preliminary stage of a winding operation of the carbon fiber, an operation of removing the weld bead by cutting is performed. As this operation, manual operation by an operator or automatic cutting using a lathe is performed.

SUMMARY

In order to improve work efficiency of the weld bead cutting operation, it is preferred that automatic cutting using the lathe is performed.

When a section of the liner (a section in a direction orthogonal to an axis) is a perfect circle, and a center position of the section coincides with a rotation axis of the section on the lathe, a distance between the rotation axis and the outer peripheral surface of the liner is uniform throughout the entire circumference of the liner. Therefore, it is possible to cut the weld bead well in the entire circumferential direction by simply rotating the liner while a blade of the lathe (a cutting tool) is fixed at a position so as to come into contact with the weld bead (a position where the blade is able to cut the entire weld bead).

However, a section of an actual liner (a section in a direction orthogonal to an axis) may not be a perfect circle (for example, the section may have an elliptical shape) due to an influence of a machining error or centrifugal force caused by rotation. Further, even when the section of the liner is a perfect circle, there are cases where a distance between the rotation axis and the outer peripheral surface of the liner may be non-uniform throughout the entire circumference of the liner due to an influence of the centrifugal force.

In particular, in a case of a liner for a hydrogen tank provided in a fuel cell system and so on, since hydrogen gas has a low molecular weight and a small atomic size, the liner is required to have a high gas barrier property (a high gas barrier property obtained by using a resin material with a metal-level intermolecular distance). Therefore, a nylon material or the like is used as a material for the liner. These materials have an especially high melting point and high crystallinity, and they are hard to mold into a given shape. Since a shrinkage factor varies greatly in respective parts at the time of cooling after injection molding, it is difficult to mold this kind of material into a perfect circle, and the issue described above tends to happen. The foregoing issue can similarly happen to a liner for a tank other than a hydrogen tank.

FIG. 12 and FIG. 13 show a cutting operation of a weld bead b with a lathe in a case where a section of a liner a has an elliptical shape (showing a section viewed in a direction along a rotation axis o). As shown in FIG. 12, in a situation where a cutting tool d of the lathe faces a region where a distance between the rotation axis o and an outer peripheral surface c of the liner a is short, there is a possibility that the cutting tool d does not reach the weld bead b. This means that, in this region, the weld bead b may not be cut completely. A virtual line in FIG. 12 shows a shape of the outer peripheral surface in a case where the section of the liner a is a perfect circle. Meanwhile, as shown in FIG. 13, in a situation where the cutting tool d of the lathe faces a region where the distance between the rotation axis o and the outer peripheral surface c of the liner a is long, the cutting tool d reaches not only the weld bead b but also the outer peripheral surface of the liner a, and may cut the outer peripheral surface c. This means that, in this region, the liner a becomes partially thin, and perforation may happen.

The disclosure provides a weld bead cutting device and a weld bead cutting method by which a weld bead can be cut well in an entire circumferential direction, even when a section of a liner (a workpiece) is not a perfect circle, or a distance between a rotation axis and an outer peripheral surface of the liner is non-uniform throughout an entire circumference of the liner (the distance is non-uniform even though the section of the liner is a perfect circle).

An aspect of the disclosure is a weld bead cutting device configured to cut a weld bead generated on an outer circumference of a welding portion. The weld bead is generated when end edges of two resin members are abutted on and welded to each other. Each of the end edges has a ring shape on an open side. According to the aspect of the disclosure, the weld bead cutting device includes a rotation mechanism, a cutting tool, at least two pressing rotors, and a reciprocation unit. The rotation mechanism is configured to rotate a workpiece that is formed as at least the two resin members are welded to each other. The workpiece is rotated around a rotation axis that extends along an abutting direction of the at least two resin members. The cutting tool is arranged on an outer peripheral side of the workpiece and is configured to cut the weld bead. The at least two pressing rotors are arranged on both sides of the cutting tool in an extending direction of the rotation axis, and configured to be pressed against the outer peripheral surface of the workpiece. The reciprocation unit is configured to hold the cutting tool and the pressing rotors and reciprocate the cutting tool and the pressing rotors relative to the workpiece along a direction orthogonal to the extending direction of the rotation axis.

With the above aspect, when the weld bead is cut, the workpiece (the workpiece formed as the end edges of the two resin members are abutted on and welded to each other, each of the end edges having the ring shape on the open side) is set on the weld bead cutting device, and the rotation mechanism rotates the workpiece around the rotation axis extending along the abutting direction. Also, as the reciprocation unit moves the pressing rotors forward in the direction orthogonal to the extending direction of the rotation axis, the pressing rotors are pressed against the outer peripheral surface of the workpiece. Thus, the outer peripheral surface of the workpiece is deformed compulsorily. Since the pressing rotors are pressed against the outer peripheral surface of the workpiece on both sides of the weld bead in the extending direction of the rotation axis, the weld bead being faced with the cutting tool, there is almost no unevenness on the outer peripheral surface of the workpiece among the pressing rotors. This means that only the weld bead projects on the outer peripheral surface that has no unevenness. In this state, the cutting tool is pressed against the weld bead, and the weld bead is cut. As the workpiece is rotated by the rotation mechanism, the weld bead sequentially moves to a position facing the cutting tool (sequentially moves along the circumferential direction). Since the outer peripheral surface around the weld bead (the outer peripheral surface of the workpiece) has no unevenness due to pressing force from the pressing rotors, it is possible to restrain large changes in a distance between the outer peripheral surface of the workpiece and the cutting tool, and it is thus possible to continuously cut the weld bead well by using the cutting tool, the weld bead extending along the outer peripheral surface of the workpiece. Therefore, it is possible to cut the weld bead well in the entire circumferential direction even when the section of the workpiece is not a perfect circle, or the distance between the rotation axis and the outer peripheral surface of the workpiece is non-uniform throughout the entire circumference of the workpiece (the distance is non-uniform even though the section of the workpiece is a perfect circle).

According to the aspect of the disclosure, the pressing rotors may be arranged at four locations that surround a position where the cutting tool is arranged, and outer surfaces of the pressing rotors on a side facing the outer peripheral surface of the workpiece may be positioned on a virtual plane extending along the extending direction of the rotation axis.

Thus, in the state where the pressing rotors are pressed against the outer peripheral surface of the workpiece, a region of the outer peripheral surface surrounded by the pressing rotors (a region on the outer peripheral surface of the workpiece) becomes an almost flat surface extending along the extending direction of the rotation axis. This means that it is possible to cut the weld bead with the cutting tool in a state where the weld bead projects from the outer peripheral surface of the workpiece formed into a flat surface. Thus, it is possible to cut the weld bead easily.

According to the aspect of the disclosure, the reciprocation unit may be configured to reciprocate the cutting tool and the pressing rotors independently from each other.

As described above, with the configuration in which the cutting tool and the pressing rotors are able to reciprocate independently from each other, the cutting tool may retreat from the weld bead and the pressing rotors may be pressed against the outer peripheral surface of the workpiece, and then the cutting tool may be moved forward so as to cut the weld bead. This means that, after unevenness is removed from the outer peripheral surface of the workpiece, the weld bead can be cut gradually along a height direction of the weld bead. Thus, it is possible to perform a weld bead cutting operation stably.

According to the aspect of the disclosure, the reciprocation unit may be configured to reciprocate the pressing rotors together with the cutting tool so that pressing force from the pressing rotors onto the outer peripheral surface of the workpiece is maintained constant while the cutting tool is cutting the weld bead.

When the section of the workpiece is not a perfect circle, situations are generated where the cutting tool faces a region where a distance between the rotation axis of the workpiece and the outer peripheral surface of the workpiece is short, and where the cutting tool faces a region where a distance between the rotation axis of the workpiece and the outer peripheral surface of the workpiece is long. In the former case, since the outer peripheral surface of the workpiece retreats from (moves in a direction away from) the cutting tool the cutting tool, the pressing rotors are moved forward together with the cutting tool so that the pressing force is maintained constant. Meanwhile, in the latter case, since the outer peripheral surface of the workpiece tries to move forward to the cutting tool (move in a direction towards the cutting tool), the pressing rotors are moved to retreat together with the cutting tool in order to maintain the pressing force constant. With this control (load control), a pressing state of the pressing rotors against the outer peripheral surface of the workpiece is maintained constant, and a stable deformed state of the outer peripheral surface of the workpiece is obtained. Thus, it becomes possible to reliably restrain generation of a situation where the cutting tool does not reach the weld bead and thus the weld bead cannot be cut completely, and generation of a situation where the cutting tool reaches the outer peripheral surface of the workpiece and the workpiece becomes partially thin.

According to the aspect of the disclosure, the workpiece may be a liner used for a hydrogen tank.

Since hydrogen gas has a low molecular weight and a small atomic size, a material having a high gas barrier property is used for the liner that is used for the hydrogen tank. This kind of material has an especially high melting point and high crystallinity, and it is hard to mold this kind of material into a given shape. Since a shrinkage factor varies greatly in respective parts at the time of cooling after injection molding, it is difficult to mold this material into a perfect circle. The disclosure is especially effective for a workpiece that is molded by using this kind of material because a weld bead can be cut well in the entire circumferential direction.

According to another aspect of the disclosure, a weld bead cutting method is provided. This aspect is the weld bead cutting method by which a weld bead generated on an outer circumference of a welding portion is cut. The weld bead is generated when end edges of two resin members are abutted on and welded to each other, each of the end edges having a ring shape on an open side. The weld bead cutting method includes rotating a workpiece and cutting the weld bead. The workpiece formed as at least the two resin members are welded to each other is rotated around a rotation axis extending along an abutting direction of the at least two resin members, and the weld bead is cut with a cutting tool in a state where pressing rotors are pressed against an outer peripheral surface of the workpiece on both sides of the weld bead in an extending direction of the rotation axis. The cutting tool is faced with the weld bead.

Also with the weld bead cutting method, it is possible to cut the weld bead well in the entire circumferential direction even when a section of the workpiece is not a perfect circle, or a distance between the rotation axis and the outer peripheral surface of the workpiece is non-uniform throughout the entire circumference of the workpiece (the distance is non-uniform even though the section of the workpiece is a perfect circle).

According to the disclosure, it is possible to cut the weld bead well in the entire circumferential direction even when the section of the workpiece is not a perfect circle or the distance between the rotation axis and the outer peripheral surface of the workpiece is non-uniform throughout the entire circumference of the workpiece (the distance is not uniform even though the section of the workpiece is a perfect circle).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure is described based on drawings. The embodiment describes a case in which the disclosure is applied as a weld bead cutting device that removes a weld bead by cutting, the weld bead being generated on an outer circumference of a liner of a resin tank.

Structure of Tank

Description of a structure of the tank is given before the weld bead cutting device is described.

Figure 1:
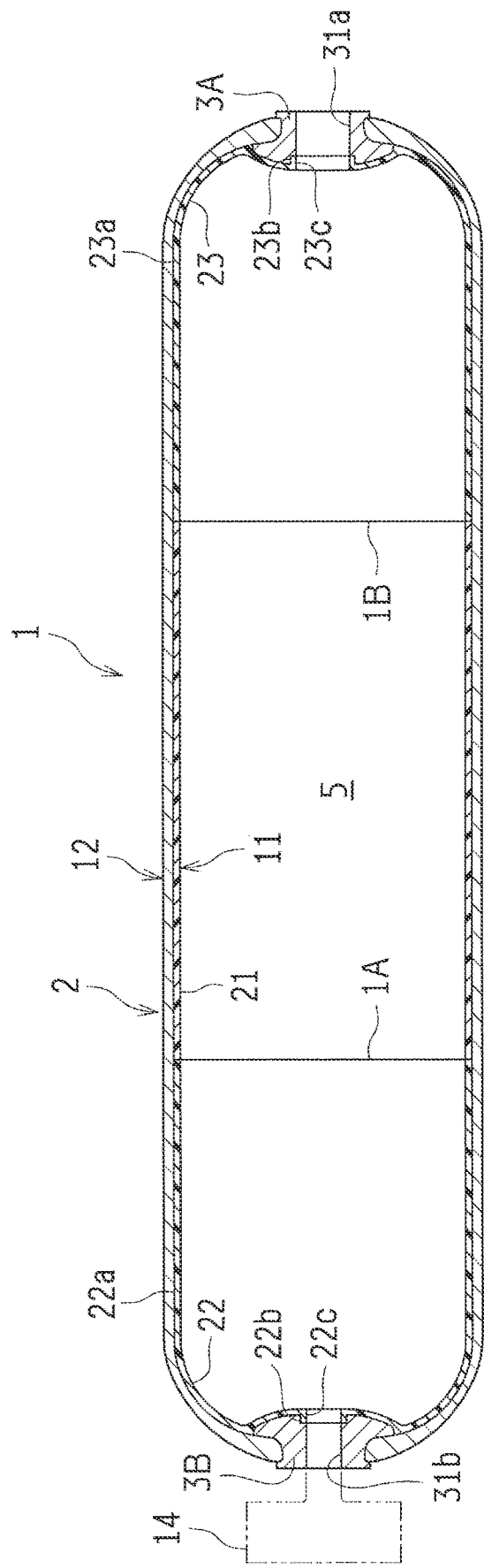
FIG. 1 is a sectional view of a tank according to an embodiment, taken along an axis direction of the tank.

FIG. 1 is a sectional view of a tank 1 taken along an axis direction of the tank 1. As shown in FIG. 1, the tank 1 includes a tank body 2 and caps 3A, 3B. The tank body 2 has a sealed cylindrical shape as a whole, and the caps 3A, 3B are attached to both end portions (a first side portion and a second side portion) of the tank body 2 in a longitudinal direction (an axis direction), respectively.

An inside of the tank body 2 serves as a storage space 5 where gas is stored. Gas at ordinary pressure may be filled in the tank 1, and gas at pressure higher than the ordinary pressure may be stored in the tank 1. For example, in a fuel cell system, pressure of fuel gas (hydrogen) filled inside the tank 1 in a high-pressure state is reduced, and the resultant fuel gas is supplied for power generation in the fuel cell.

The tank body 2 has a liner 11 (an inner shell) and a reinforcing portion 12 (an outer shell). The liner 11 is made from a resin material with an excellent gas barrier property (a multilayer material containing an ethylene-vinyl alcohol material, a nylon material, and so on). The reinforcing portion 12 is made from fiber reinforced plastic (so-called FRP) containing carbon fiber and epoxy resin, and is formed by being wounded around the outer circumference of the liner 11.

The caps 3A, 3B are formed by using metal such as stainless steel, and are provided in centers of semispherical-shaped end wall portions of the tank body 2, respectively. Internal threads (not shown) are formed on inner peripheral surfaces of openings 31a, 31b provided in the caps 3A, 3B, respectively. Thus, functional parts such as piping and a valve assembly 14 can be screwed into and connected with the caps 3A, 3B through the internal threads, respectively. In FIG. 1, a two-dot chain line shows an example in which the valve assembly 14 is provided only in the cap 3B out of the caps 3A, 3B. For example, in a case of the tank 1 applied to a fuel cell system, the storage space 5 and an external gas flow passage (not shown) are connected with each other through the valve assembly 14 in which piping elements such as a valve and a joint are assembled integrally. Thus, hydrogen can be filled in the storage space 5, and hydrogen can also be released from the storage space 5.

The liner 11 is made as three separated liner portions (resin molded articles) 21, 22, 23 over the longitudinal direction are joined to each other by infrared welding and so on. This means that end edges of the side liner portions 22, 23 having a bowl shape are joined to both end edges of the center liner portion 21 having a cylindrical shape by infrared welding and so on, respectively, and thus the hollow liner 11 is structured. Thus, the liner 11 is made as the ring-shaped end edges of the resin members (the liner portions 21, 22, 23) on their open sides abut on and welded to each other.

The center liner portion 21 is molded into the cylindrical shape extending along the axis direction of the liner 11 with a given length.

Further, in side liner portions 22, 23, trunk portions 22a, 23a are provided, respectively, each of which extends with a given length along the axis direction of the liner 11. In each of the trunk portions 22a, 23a, a first end side (a side toward the center liner portion 21) in the axis direction is open. This means that this portion serves as the end edge on the open side. The side liner portions 22, 23 have bent portions 22b, 23b and communication portions 22c, 23c, respectively. The bent portions 22b, 23b are formed in end portions of the trunk portions 22a, 23a on their second end sides (outer sides), respectively, the end portions of the trunk portions 22a, 23a having reduced diameters, respectively. The communication portions 22c, 23c are open in center portions of the bent portions 22b, 23b, respectively.

The bent portions 22b, 23b have functions of ensuring strength of the side liner portions 22, 23, respectively. The caps 3A, 3B are positioned between outer peripheral surfaces of the bent portions 22b, 23b and end portions of the reinforcing portion 12, respectively.

Weld Bead Cutting Device

Next, a weld bead cutting device 100 is described that is used to remove a weld bead, by cutting, generated on the outer circumference of the liner 11.

Figure 2:
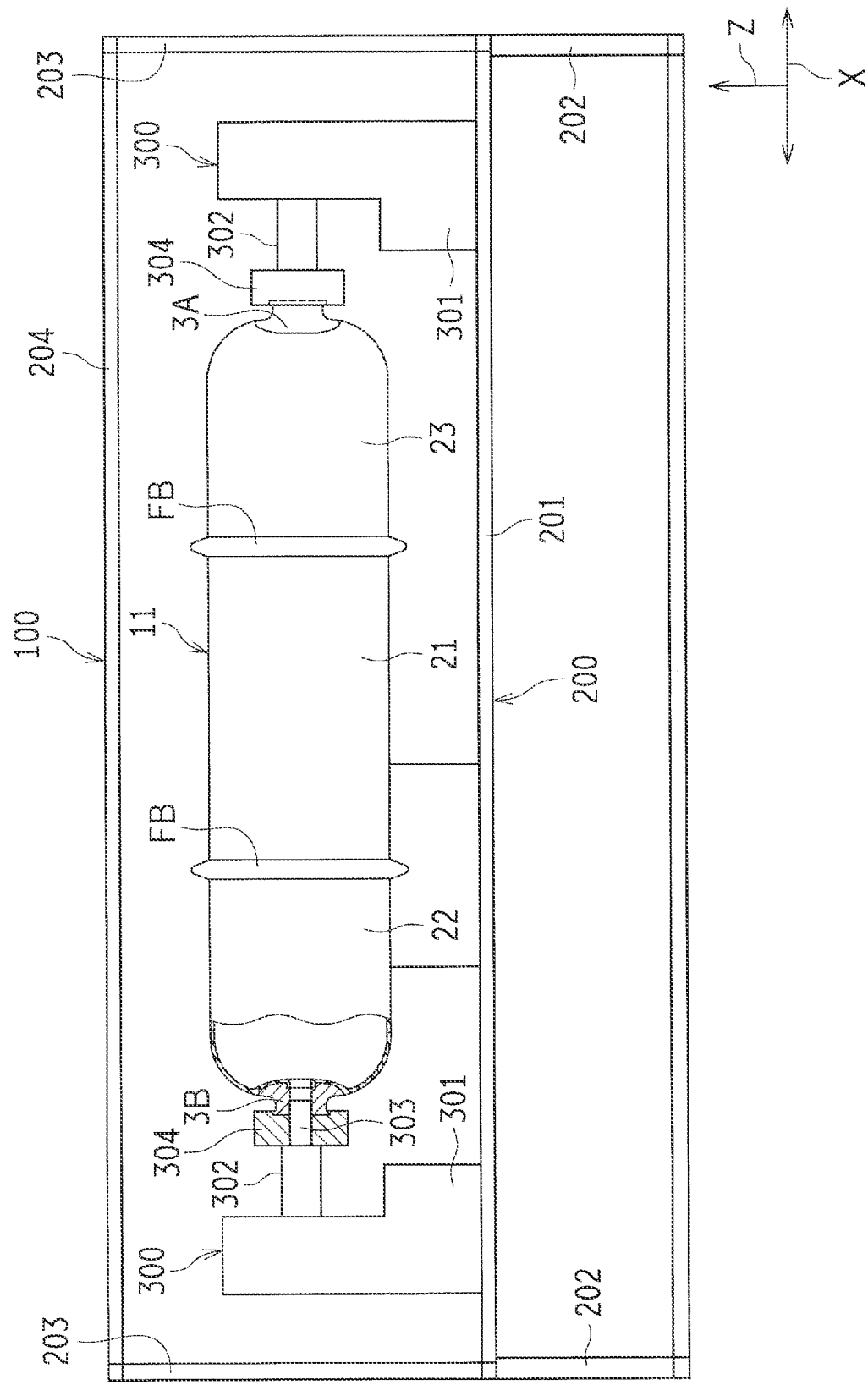
FIG. 2 is a side view of a state where a liner is set on a weld bead cutting device.
Figure 3:
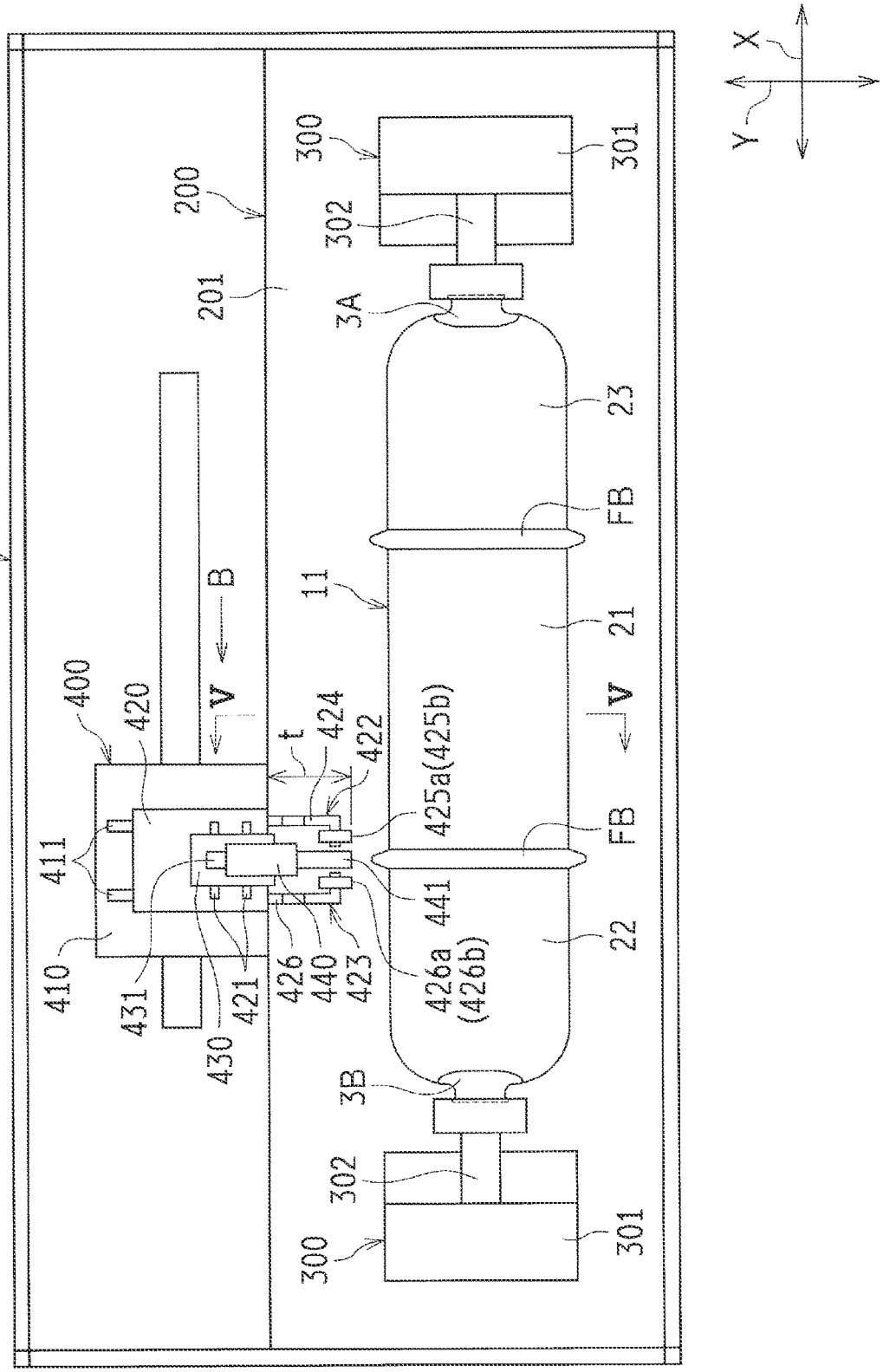
FIG. 3 is a plan view of a state where the liner is set on the weld bead cutting device, and is a bird's eye view of the weld bead cutting device seen along a vertical direction.

FIG. 2 is a side view of a state where the liner 11 is set on the weld bead cutting device 100. Also, FIG. 3 is a plan view of a state where the liner 11 is set on the weld bead cutting device 100, and is a bird's eye view of the weld bead cutting device 100 seen along a vertical direction. As shown in these drawings, on the weld bead cutting device 100, a workpiece (an intermediate molded article of the tank 1 before a step of forming the reinforcing portion 12) is set. The workpiece is in a state where the caps 3A, 3B are attached to the liner 11 that is made as the center liner portion 21 and the side liner portions 22, 23 are joined to each other. Hereinafter, the intermediate molded article is also referred to as the liner 11 for convenience.

The weld bead cutting device 100 is for removing the weld beads FB by cutting, the weld beads FB being generated on outer circumferences of joining portions 1A, 1B (see FIG. 1) where the center liner portion 21 and the side liner portions 22, 23 are joined to each other, respectively. In the following description, a longitudinal direction of the weld bead cutting device 100 (a direction along the axis direction of the liner 11 in a state where the liner 11 is set) is defined as an X direction, a horizontal direction orthogonal to the X direction is defined as a Y direction, and a vertical direction is defined as a Z direction.

Specifically, when the center liner portion 21 and the side liner portions 22, 23 are welded to each other, respectively, the weld beads FB are generated as a part of resin (the resin material that structures the end edges of the center liner portion 21 and the side liner portions 22, 23) in a molten state due to heating flows out towards an outer peripheral side of the liner 11, and then is cured by cooling. There is a possibility that the weld beads FB become a cause of breakage of the carbon fiber or the like when the carbon fiber is wound around the outer circumference of the liner 11 in order to construct the reinforcing portion 12. Further, when there are the weld beads FB, a gap is made between the outer peripheral surface of the liner 11 and the reinforcing portion 12, and that can adversely affect strength of the tank 1.

Therefore, it is necessary to remove the weld beads FB by cutting. Conventionally, it is considered that automatic cutting using a lathe should be performed in order to improve work efficiency of this weld bead cutting operation. When a section of a liner (a section along a direction orthogonal to the axis) is a perfect circle, and the center position of the section coincides with a rotation axis of the section on the lathe, a distance between the rotation axis and an outer peripheral surface of the liner is uniform throughout the entire circumference of the liner. Therefore, it is possible to cut the weld bead well in the entire circumferential direction by simply rotating the liner while a blade (a cutting tool) of the lathe is fixed at a position where the blade comes into contact with the weld bead (a position where the blade is able to cut the whole weld bead).

However, a section of an actual liner may not be a perfect circle (for example, the section may have an elliptical shape) due to an influence of a machining error or centrifugal force caused by rotation. Further, even when the section of the liner is a perfect circle, there are cases where a distance between a rotation axis and an outer peripheral surface of the liner may be non-uniform throughout the entire circumference of the liner due to an influence of the centrifugal force. In particular, in a case of a liner for a hydrogen tank provided in a fuel cell system and so on, since hydrogen gas has a low molecular weight and a small atomic size, the liner is required to have a high gas barrier property (a high gas barrier property obtained by using a resin material with a metal-level intermolecular distance), and a multilayer material containing an ethylene-vinyl alcohol material, a nylon material, and so on are used as a material for the liner, as described earlier. These materials have an especially high melting point and high crystallinity, and it is hard to mold these materials into a given shape. Also, since a shrinkage factor varies greatly in respective parts at the time of cooling after injection molding, it is difficult to mold this kind of material into a perfect circle, and the issue described above tends to happen.

Figure 12:
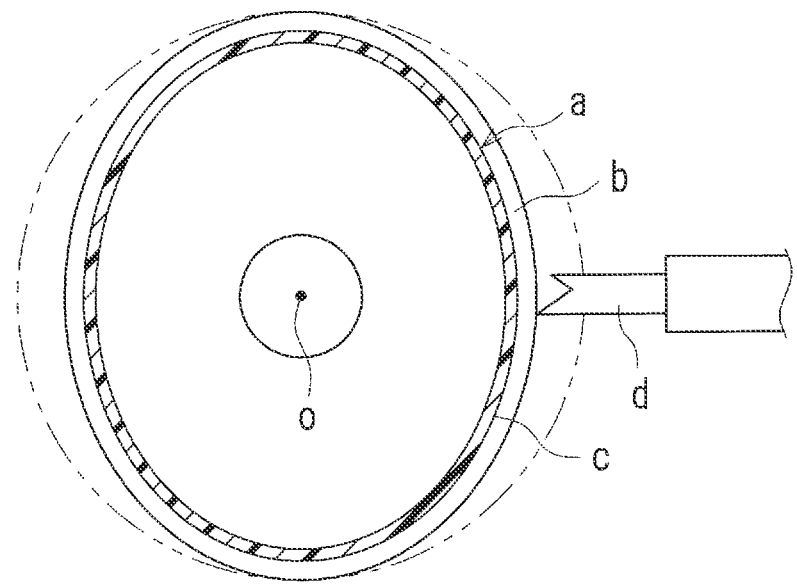
FIG. 12 is a view of a situation where a cutting tool of a lathe faces a region in which a distance between a rotation axis and an outer peripheral surface of a liner is short during a cutting operation using the lathe in a case where a section of the liner has an elliptical shape according to a related art.
Figure 13:
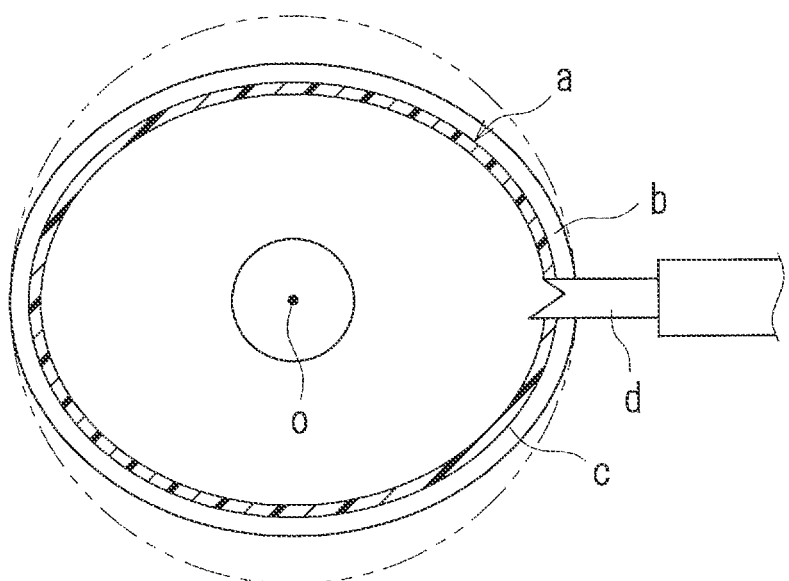
FIG. 13 is a view of a situation where the cutting tool of the lathe faces a region in which a distance between the rotation axis and the outer peripheral surface of the liner is long during the cutting operation using the lathe in the case where the section of the liner has the elliptical shape according to the related art.

Therefore, in a situation where the cutting tool of the lathe faces a region where a distance between the rotation axis and the outer peripheral surface of the liner is short (a situation shown in FIG. 12), the cutting tool may not reach the weld bead. This means that the weld bead may not be cut completely. Meanwhile, in a situation where the cutting tool of the lathe faces a region where a distance between the rotation axis and the outer peripheral surface of the liner is long (a situation shown in FIG. 13), the cutting tool reaches not only the weld bead but also the outer peripheral surface of the liner, and can cut the outer peripheral surface. This means that the liner becomes partially thin, and perforation may happen.

The weld bead cutting device 100 according to the embodiment is able to cut the weld bead FB well in the entire circumferential direction even when the section of the liner 11 is not a perfect circle, or the distance between the rotation axis and the outer peripheral surface of the liner 11 is non-uniform throughout the entire circumference of the liner 11 (the distance is not uniform even when the section of the liner 11 is a perfect circle). Specific description is given below.

As shown in FIG. 2 and FIG. 3, the weld bead cutting device 100 includes a base stand 200, a pair of right and left liner rotation units (a rotation mechanism in the disclosure) 300, and a cutting unit 400. Each of them is described below.

The base stand 200 includes a base plate 201 extending in the horizontal direction, and the base plate 201 is supported by a plurality of support legs 202. A dimension of a length of the base plate 201 (a dimension in the X direction) is set to be sufficiently longer than a dimension of a length of the liner 11 in a direction along the axis direction. Further, an upper frame portion 204 is arranged above the base plate 201. The upper frame portion 204 is supported by column portions 203 erected on the base plate 201.

Each of the liner rotation units 300 is for supporting the liner 11 in a state where the liner 11 is arranged transversely (a state where the axis direction of the liner 11 is horizontal), and also for rotating the liner 11 so that the axis of the liner 11 serves as the center of rotation (the rotation axis). This means that the liner rotation units 300 rotate the liner 11 around the rotation axis extending in a direction along the abutting direction (the direction in which the liner portions 21, 22, 23 are abutted on each other, respectively).

Specifically, each of the liner rotation units 300 includes a unit body 301 and a rotation rod 302. The unit body 301 is able to slide on the base plate 201, and the rotation rod 302 projects from the unit body 301 in the horizontal direction (the horizontal direction towards a center side of the base plate 201).

The unit body 301 is able to move in the horizontal direction (the X direction) on a rail (not shown) provided on the base plate 201. A power source for the unit body 301 to have sliding movements is an electric motor (not shown). A different power source may also be used. Further, the rotation rod 302 is supported by bearings (not shown) provided inside the unit body 301 so that the rotation rod 302 is able to rotate around the horizontal axis (around the horizontal axis in the X direction), and the rotation rod 302 is able to rotate around the horizontal axis as the rotation rod 302 receives power from an electric motor (not shown). A different power source may be used as the power source for rotation of the rotation rod 302. Moreover, distal end portions of the rotation rods 302 serve as fitting portions 303 that are inserted in and fitted to the openings 31a, 31b (see FIG. 1) provided in the caps 3A, 3B, respectively. To fit the fitting portions 303 to the openings 31a, 31b, respectively, so-called spigot joint fitting is used. Further, retaining members 304 are attached to the distal end portions of the rotation rods 302, respectively. The retaining members 304 are used to retain the caps 3A, 3B so that the caps 3A, 3B are not able to rotate relative to the rotation rods 302, respectively. Thus, the retaining members 304 retain the end portions (the caps 3A, 3B) of the liner 11 so that the end portions are not able to rotate relative to the rotation rods 302, respectively. As the rotation rod 302 rotates in this retained state, its rotational force is transmitted to the liner 11, and the liner 11 is rotated around the horizontal axis (around the horizontal axis in the X direction). A support structure for the liner 11 using the rotation rod 302 is not limited to the one described above.

Figure 4:
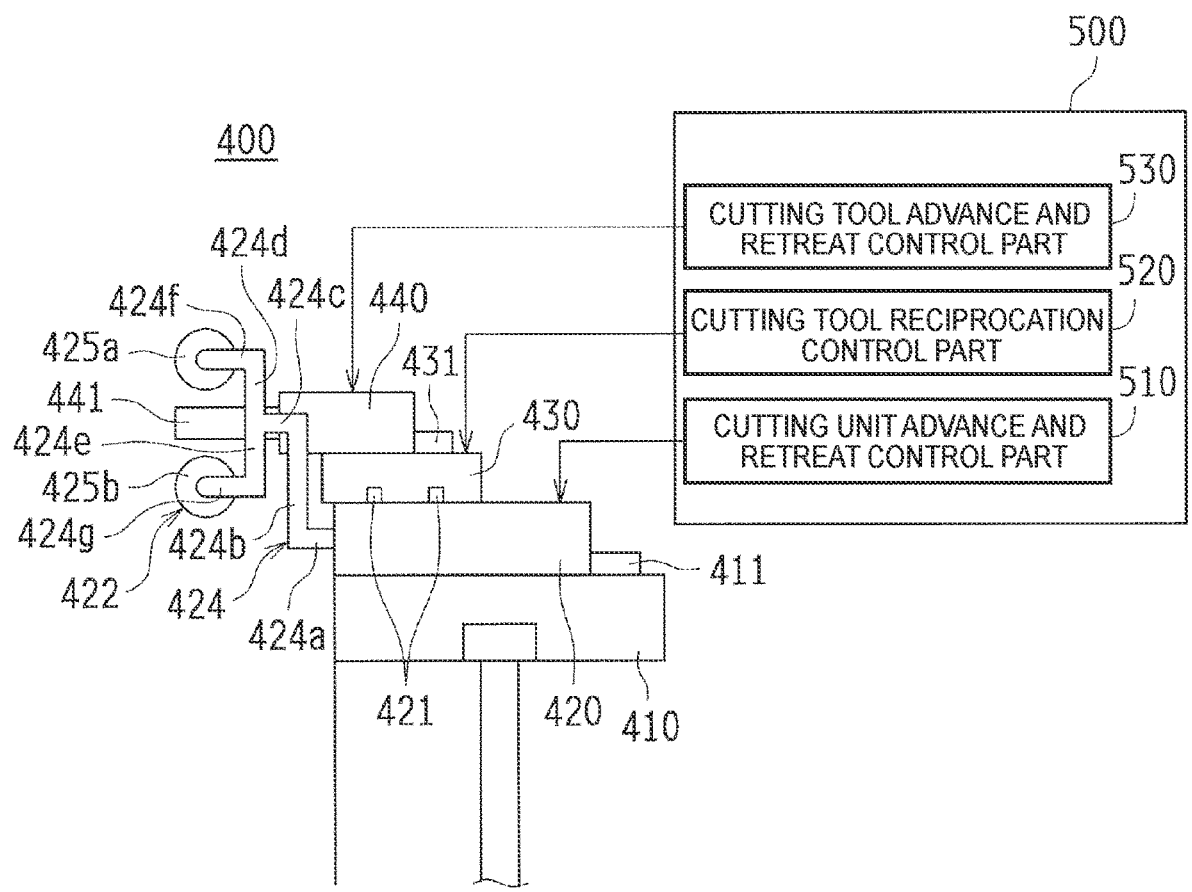
FIG. 4 is a view of a cutting unit and a control unit for the cutting unit in the weld bead cutting device.

The cutting unit 400 is for removing the weld bead FB by cutting. FIG. 4 is a view of the cutting unit 400 and its control system. The cutting unit 400 shown in FIG. 4 is a view taken along the arrow B in FIG. 3.

As shown in FIG. 3 and FIG. 4, the cutting unit 400 has a configuration in which a first slider 420, a second slider 430, and a third slider 440 are supported on a unit stand 410 so that the first slider 420, the second slider 430, and the third slider 440 are able to slide relative to each other. The unit stand 410 is able to slide along the X direction.

The first slider 420 is supported by rails 411 that are provided on the unit stand 410 and extend along the Y direction, and the first slider 420 is able to slide on the rails 411 along the Y direction. The second slider 430 is supported by rails 421 that are provided on the first slider 420 and extend along the X direction, and the second slider 430 is able to slide on the rails 421 along the X direction. The third slider 440 is supported by a rail 431 that is provided on the second slider 430 and extends along the Y direction, and the third slider 440 is able to slide on the rail 431 along the Y direction. A power source for the sliders 420, 430, 440 to have sliding movements is an electric motor (not shown). A different power source may be used instead.

A cutting tool 441 for cutting the weld bead FB is attached to a distal end portion of the third slider 440 (a distal end portion on the liner 11 side) in a detachable fashion. As the cutting tool 441, a widely-known tool bit is employed.

Roller units 422, 423 are provided in the first slider 420. The roller units 422, 423 are arranged on both sides of the cutting tool 441 (both sides in the X direction). Here, the roller unit 422 on the right side in FIG. 3 is referred to as a first roller unit 422, and the roller unit 423 on the left side in FIG. 3 is referred to as a second roller unit 423. A distance between the cutting tool 441 and the first roller unit 422 (a distance in the X direction), and a distance between the cutting tool 441 and the second roller unit 423 (a distance in the X direction) are the same as each other and set to be relatively short. Specifically, these distances are set so as to be as short as possible within a range where the roller units 422, 423 do not interfere with the weld bead FB (later-described rollers 425a, 425b, 426a, 426b do not interfere with the weld bead FB) when the cutting tool 441 cuts the weld bead FB.

As shown in FIG. 4, the first roller unit 422 is configured as the pair of upper and lower rollers (pressing rotors according to the disclosure) 425a, 425b is supported by a support arm 424 that is connected with a distal end surface (a distal end surface on the liner 11 side) of the first slider 420.

The support arm 424 includes a first horizontal portion 424a, a first vertical portion 424b, a second horizontal portion 424c, a second vertical portion 424d, a third vertical portion 424e, a third horizontal portion 424f, and a fourth horizontal portion 424g. The first horizontal portion 424a extends in the horizontal direction from the distal end surface of the first slider 420 along the Y direction. The first vertical portion 424b extends vertically upward from a distal end portion (a distal end portion on the liner 11 side) of the first horizontal portion 424a. The second horizontal portion 424c extends in the horizontal direction from an upper end of the first vertical portion 424b along the Y direction. The second vertical portion 424d and the third vertical portion 424e extend vertically upward and downward, respectively, from a distal end portion of the second horizontal portion 424c. The third horizontal portion 424f extends in the horizontal direction from an upper end of the second vertical portion 424d along the Y direction and supports the roller 425a so that the roller 425a is able to roll around the X axis. The fourth horizontal portion 424g extends in the horizontal direction from a lower end of the third vertical portion 424e along the Y direction, and supports the roller 425b so that the roller 425b is able to roll around the X axis.

Positions of the rollers 425a, 425b coincide with each other in the Y direction. This means that distances between the distal end surface of the first slider 420 and outer peripheral ends of the rollers 425a, 425b on the liner 11 side (outer surfaces on the side facing the outer peripheral surface of the liner 11) (a distance t in FIG. 3) are the same as each other.

Also, in a side view in FIG. 4, height positions of the rollers 425a, 425b are set so that the cutting tool 441 is positioned between the roller 425a on the upper side and the roller 425b on the lower side. This means that a height position at which the cutting tool 441 is arranged is lower than the height position at which the roller 425a on the upper side is arranged, and higher than the height position at which the roller 425b on the lower side is arranged.

The second roller unit 423 has the similar configuration to that of the first roller unit 422, and is configured as the pair of upper and lower rollers (pressing rotors according to the disclosure) 426a, 426b is supported by a support arm 426. Positions of the rollers 426a, 426b in the Y direction coincide with the positions of the rollers 425a, 425b in the Y direction, respectively. This means that distances between the distal end surface of the first slider 420 and outer peripheral ends of the rollers 426a, 426b on the liner 11 side (the distance t in FIG. 3) are the same as each other.

Further, in the side view, the height positions of the rollers 426a, 426b are also set so that the cutting tool 441 is positioned between the roller 426a on the upper side and the roller 426b on the lower side. This means that the height position at which the cutting tool 441 is arranged is lower than the height position at which the roller 426a on the upper side is arranged, and higher than the height position at which the roller 426b on the lower side is arranged.

Thus, the four rollers 425a, 425b, 426a, 426b in total are arranged on both sides of the cutting tool 441 in the X direction and on both sides in the Z direction, respectively. Since the arrangement positions are set for the rollers 425a, 425b, 426a, 426b as described earlier, a virtual plane that connects the outer peripheral surfaces of the rollers 425a, 425b, 426a, 426b on the liner 11 side becomes a plane extending in the X direction and the Z direction (a plane extending along the vertical direction), in other words, a plane defined both in the X and Z directions. The rollers 425a, 425b, 426a, 426b are made from the same material and have the same diameter. The material may be resin or metal.

The weld bead cutting device 100 is provided with a controller 500 that is for controlling sliding movements of each of the sliders 420, 430, 440. The controller 500 includes a generally-known central processing unit (CPU), a read only memory (ROM), a random access memory (RAM), and so on (not shown). The ROM stores a control program and so on that controls a cutting operation of the weld bead FB. The CPU executes computation processing based on the control program stored in the ROM. The RAM is a memory that temporarily stores results of computation in the CPU, and so on.

The controller 500 includes a cutting unit advance and retreat control part 510 for controlling sliding movements of the first slider 420, a cutting tool reciprocation control part 520 for controlling sliding movements of the second slider 430, and a cutting tool advance and retreat control part 530 for controlling sliding movements of the third slider 440.

When the first slider 420 is caused to have a sliding movement due to control by the cutting unit advance and retreat control part 510, the sliders 420, 430, 440 have a sliding movement integrally in the Y direction because the second slider 430 and the third slider 440 are placed on the first slider 420. This sliding movement causes the cutting tool 441 and the rollers 425a, 425b, 426a, 426b to have a sliding movement integrally in the Y direction.

Further, when the second slider 430 is caused to have a sliding movement due to control by the cutting tool reciprocation control part 520, the sliders 430, 440 have a sliding movement integrally in the X direction (a sliding movement relative to the first slider 420) because the third slider 440 is placed on the second slider 430. This sliding movement causes the cutting tool 441 to have a sliding movement in the X direction.

Furthermore, when the third slider 440 is caused to have a sliding movement due to control by the cutting tool advance and retreat control part 530, only the third slider 440 has a sliding movement in the Y direction (a sliding movement relative to the first slider 420 and the second slider 430). This sliding movement causes the cutting tool 441 to have a sliding movement in the Y direction.

With the foregoing configuration, each of the sliders 420, 430, 440, each of the roller units 422, 423, and the electric motors (the electric motors serving as the power sources for the sliders 420, 430, 440 to have sliding movements, respectively) configure a reciprocation unit according to the disclosure.

Weld Bead Cutting Operation

Next, a cutting operation of the weld bead FB performed by the foregoing weld bead cutting device 100 is described. Here, description is given regarding a cutting operation of the weld bead FB in a case where a section of the liner 11 has an elliptical shape due to a machining error.

As shown in FIG. 2 and FIG. 3, the cutting operation of the weld bead FB is performed in the state where the liner 11 is set on the weld bead cutting device 100. This means that the cutting operation of the weld bead FB is performed in the state where the workpiece (the intermediate molded article of the tank 1 prior to forming of the reinforcing portion 12) is set on the weld bead cutting device 100. The workpiece is in a state where the caps 3A, 3B are attached to the liner 11 that is made by joining (welding) the center liner portion 21 and the side liner portions 22, 23 to each other in a separate step (a fabrication step of the liner 11).

When the liner (the workpiece) 11 is set on the weld bead cutting device 100, first of all, the unit bodies 301 of the liner rotation units 300 move in the horizontal direction (the X direction) on the rail (not shown) provided on the base plate 201, and the unit bodies 301 are separated from each other with a given distance (a distance longer than the dimension of the length of the liner 11 in the direction along the axis direction). Then, in a state where the liner 11 is held above the base plate 201 temporarily, each of the liner rotation units 300 is moved forward, and the fitting portions 303 provided in the distal end portions of the rotation rods 302, respectively, are inserted in and fitted to the openings 31a, 31b provided in the caps 3A, 3B, respectively. Also, the caps 3A, 3B are retained by the retaining members 304 attached to the distal end portions of the rotation rods 302, respectively, so that the caps 3A, 3B cannot rotate relative to the rotation rods 302, respectively. Because of this, as the rotation rods 302 rotate, rotational force of the rotation rods 302 is transmitted to the liner 11, and the liner 11 is able to rotate around the horizontal axis (around the horizontal axis in the X direction).

In the state where the liner 11 is set on the weld bead cutting device 100 as described above, as shown in FIG. 5 (the sectional view taken along the line V-V in FIG. 3 and showing a state before start of the cutting operation when the section of the liner 11 has an elliptical shape), the cutting unit 400 is at a retreat position (a retreat position with the given distance from the liner 11), and both the rollers 425a, 425b, 426a, 426b and the cutting tool 441 are at positions at a given distance from the liner 11.

After the liner 11 is set on the weld bead cutting device 100 as described above, the electric motor of the liner rotation units 300 is activated, and the cutting operation of the weld bead FB is performed in the state where the liner 11 is rotated around the horizontal axis (around the axis in the X direction).

Figure 6:
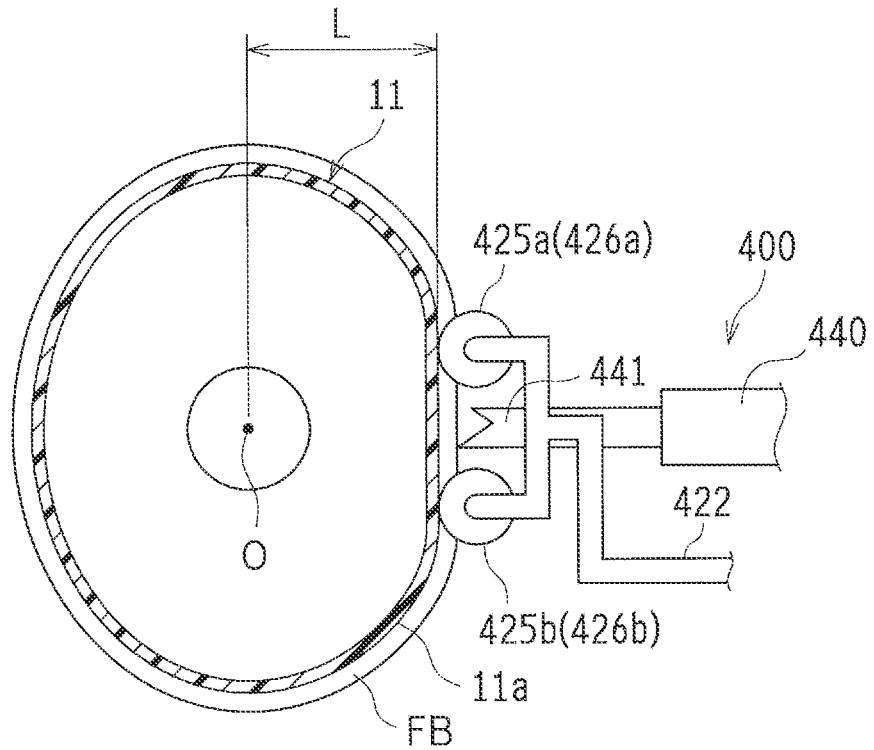
FIG. 6 is a view corresponding to FIG. 5 and shows a state at the time of start of the cutting operation.

Specifically, in the cutting operation of the weld bead FB, first of all, the first slider 420 is caused to have a sliding movement in a direction towards the liner 11 (the Y direction) by the control by the cutting unit advance and retreat control part 510 prior to activation of the electric motor (prior to rotating the liner 11). Thus, the sliders 420, 430, 440 have a sliding movement integrally in the direction towards the liner 11. Due to this sliding movement, as shown in FIG. 6, the rollers 425a, 425b, 426a, 426b come into contact with the outer peripheral surface 11a of the liner 11. Then, the cutting unit advance and retreat control part 510 causes the first slider 420 to have a sliding movement so that a distance between the rotation axis O of the liner 11 (that coincides with the rotation axes of the rotation rods 302) and each of the rollers 425a, 425b, 426a, 426b (the distance in the Y direction) becomes a given distance (a distance L in FIG. 6). The distance L is determined in advance based on experiments or simulations as a value that makes a region of the outer peripheral surface 11a surrounded by the rollers 425a, 425b, 426a, 426b (an almost square-shaped region with apexes at positions where the outer peripheral surfaces of the rollers 425a, 425b, 426a, 426b press the outer peripheral surface 11a of the liner 11, respectively) a flat surface (a value that enables the region to deform compulsorily so that the region becomes a flat surface) as the outer peripheral surface 11a of the liner 11 is pressed by each of the rollers 425a, 425b, 426a, 426b. At this point, the cutting tool 441 is at a position retreated from the outer peripheral surface 11a of the liner 11 by a given distance. Thus, in the state where the outer peripheral surface 11a of the liner 11 is pressed by each of the rollers 425a, 425b, 426a, 426b, there is almost no unevenness on the outer peripheral surface 11a of the liner 11 surrounded by the rollers 425a, 425b, 426a, 426b (the outer peripheral surface 11a becomes a flat surface as described earlier). This means that only the weld bead FB projects on the outer peripheral surface 11a that has no unevenness.

In this state, the electric motor of the liner rotation unit 300 is activated, and the liner 11 is rotated around the horizontal axis (around the axis in the X direction). Accordingly, the second slider 430 starts a sliding movement caused by the control by the cutting tool reciprocation control part 520, and the third slider 440 starts a sliding movement caused by the control by the cutting tool advance and retreat control part 530.

Due to the sliding movement of the second slider 430 caused by the control by the cutting tool reciprocation control part 520, the cutting tool 441 has a sliding movement (reciprocates) in the X direction. Also, due to the sliding movement of the third slider 440 caused by the control by the cutting tool advance and retreat control part 530, the cutting tool 441 has a sliding movement in the Y direction (a sliding movement in a direction towards the weld bead FB). Thus, the weld bead FB is cut as the cutting tool 441 is moved forward in the Y direction while the cutting tool 441 is reciprocated in the X direction.

As described earlier, the section of the liner 11 has the elliptical shape. Thus, in the state before pressing force from each of the rollers 425a, 425b, 426a, 426b is received, there are situations where the cutting unit 400 faces a region where a distance between the rotation axis O and the outer peripheral surface 11a of the liner 11 is short, and where the cutting unit 400 faces a region where a distance between the rotation axis O and the outer peripheral surface 11a of the liner 11 is long. In order to address these situations, the cutting unit advance and retreat control part 510 is configured to perform so-called load control as control that causes the first slider 420 to have a sliding movement. This means that the first slider 420 is caused to have a sliding movement so that pressing force from the rollers 425a, 425b, 426a, 426b onto the outer peripheral surface 11a of the liner 11 becomes constant.

Specifically, in the situation where the cutting unit 400 faces the region where the distance between the rotation axis O and the outer peripheral surface 11a of the liner 11 is short, the outer peripheral surface 11a of the liner 11 retreats with respect to the cutting tool 441 (moves in a direction away from the cutting tool 441). Therefore, the first slider 420 is moved forward (caused to have a sliding movement in the Y direction towards the liner 11 side), and the constant pressing force is maintained. Meanwhile, in the situation where the cutting unit 400 faces the region where the distance between the rotation axis O and the outer peripheral surface 11a of the liner 11 is long, the outer peripheral surface 11a of the liner 11 tries to move forward towards the cutting tool 441 (move in a direction towards the cutting tool 441). Therefore, the first slider 420 is moved to retreat (caused to have a sliding movement in the Y direction away from the liner 11), and this also maintains constant pressing force. A load sensor such as a load cell built in the cutting unit 400 senses the pressing force in order to perform this control. With this load control, a pressing state by the rollers 425a, 425b, 426a, 426b on the outer peripheral surface 11a of the liner 11 is maintained constant, and a deformed state of the outer peripheral surface 11a of the liner 11 is obtained in a stable manner. Accordingly, it is possible to restrain large changes in a distance between the outer peripheral surface 11a of the liner 11 and the cutting tool 441, and it is thus possible to continuously cut the weld bead FB well by using the cutting tool 441, the weld bead FB extending along the outer peripheral surface 11a of the liner 11. As a result, it becomes possible to reliably restrain generation of the situation where the cutting tool 441 does not reach the weld bead FB and thus the weld bead FB cannot be cut completely, as well as generation of the situation where the cutting tool 441 reaches the outer peripheral surface 11a of the liner 11 and the liner 11 becomes partially thin.

Further, with the control by the cutting tool advance and retreat control part 530 during the cutting operation of the weld bead FB, for example, in a case where the entire the weld bead FB is cut in two rounds of rotation of the liner 11, the cutting tool 441 is moved forward gradually in the Y direction up to a position where the cutting tool 441 reaches the outer peripheral surface 11a of the liner 11 (a position where the cutting tool 441 does not cut the outer peripheral surface 11a of the liner 11) at the time when the first round of rotation (the first rotation) of the liner 11 ends. Then, a state is held where a distal end of the cutting tool 441 reaches the outer peripheral surface 11a of the liner 11 (the state where the cutting tool 441 does not cut the outer peripheral surface 11a of the liner 11) so that the entire weld bead FB is cut in the entire circumferential direction due to the second round of rotation (the second rotation) of the liner 11.

Figure 5:
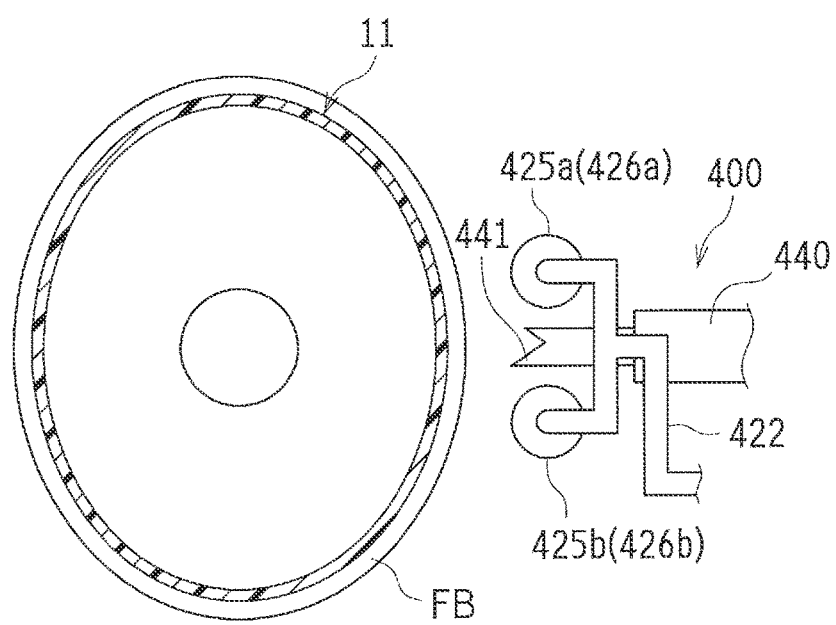
FIG. 5 is a sectional view taken along the line V-V in FIG. 3 showing a state before start of a cutting operation in a case where a section of the liner has an elliptical shape.
Figure 7:
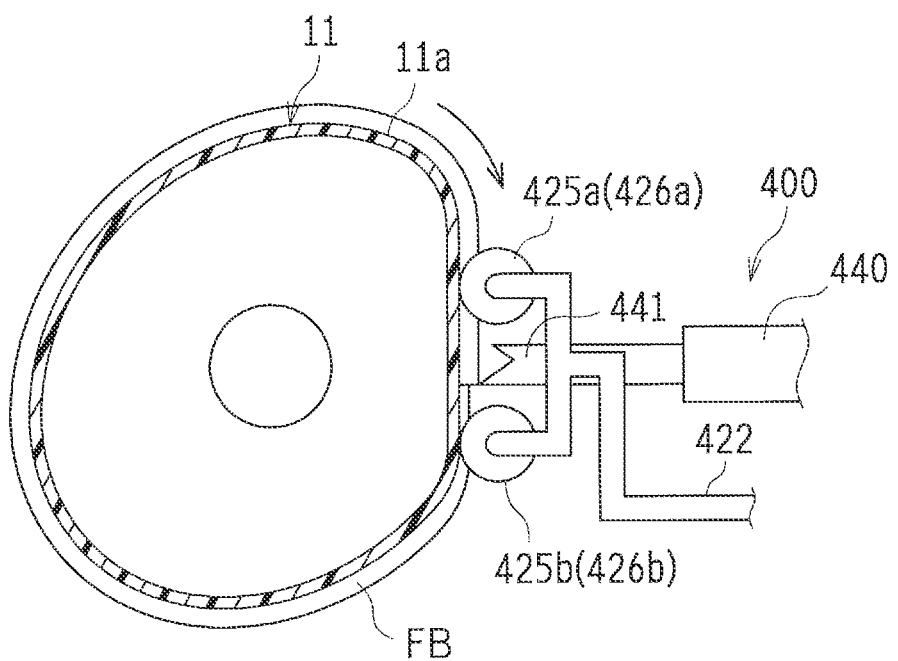
FIG. 7 is a view corresponding to FIG. 5 and shows a state where the liner is rotated by 45° after start of the cutting operation.
Figure 8:
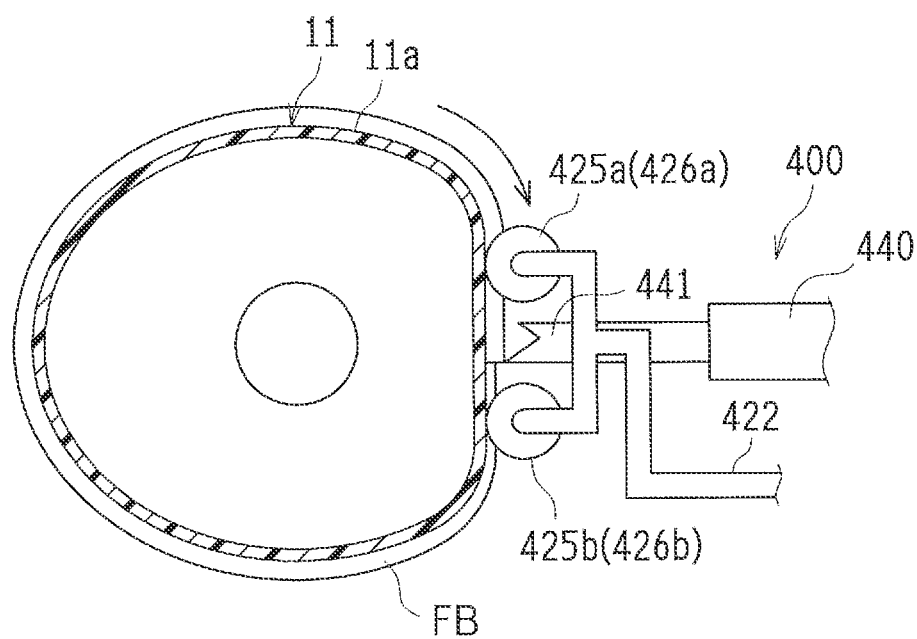
FIG. 8 is a view corresponding to FIG. 5 and shows a state where the liner is rotated by 90° after start of the cutting operation.
Figure 9:
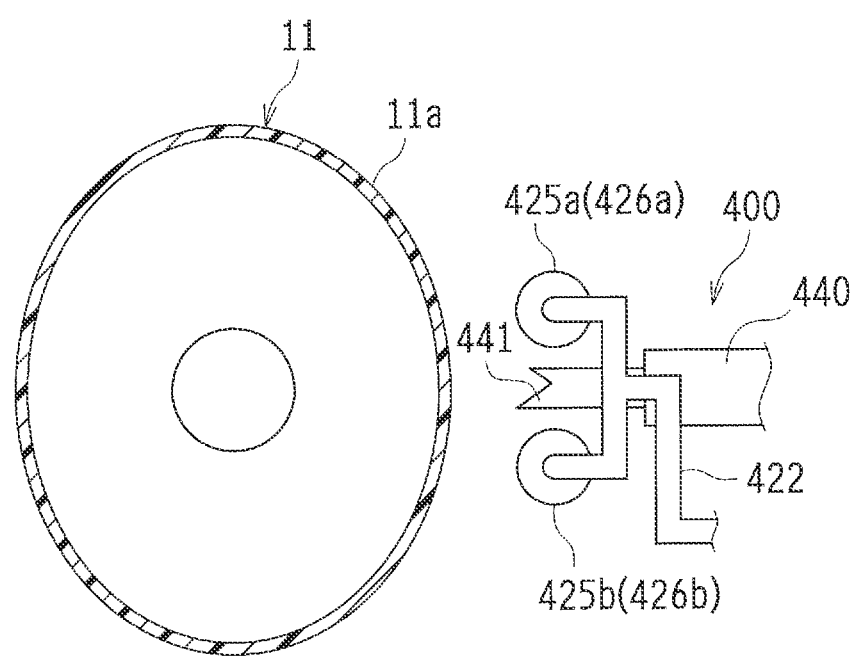
FIG. 9 is a view corresponding to FIG. 5 and shows a state where the cutting operation is completed.

FIG. 7 is a view corresponding to FIG. 5 and shows a state where the liner 11 is rotated by 45° in the first round of rotation of the liner 11 after start of the cutting operation. Also, FIG. 8 is a view corresponding to FIG. 5 and shows a state where the liner 11 is rotated by 90° in the first round of rotation of the liner 11 after start of the cutting operation. FIG. 9 is a view corresponding to FIG. 5 and shows a state where the cutting operation is completed and the cutting unit 400 retreats from the liner 11.

The number of rotations of the liner 11 in order to cut the entire weld bead FB is not limited to two, and may be one or three or more.

After the cutting operation of the weld bead FB on one side is completed, the unit stand 410 is caused to have a sliding movement along the X direction so that the cutting unit 400 is faced with the weld bead FB on the other side. Then, the cutting operation is performed similarly to the above.

Effects of the Embodiment

As described so far, in the embodiment, the liner (the workpiece) 11 that is made as the liner portions 21, 22, 23 are abutted on and welded to each other is rotated around the rotation axis that extends in a direction along the abutting direction of each of the liner portions 21, 22, 23. At the same time, the rollers 425a, 425b, 426a, 426b are pressed against the outer peripheral surface 11a of the liner 11 on both sides of the weld bead FB that is faced with the cutting tool 441 in a direction along the extending direction of the rotation axis, and, in this state, the cutting tool 441 cuts the weld bead FB. Therefore, even when the section of the liner 11 is not a perfect circle, or a distance between the rotation axis and the outer peripheral surface 11a of the liner 11 is non-uniform throughout the entire circumference of the liner 11 (even when the section of the liner 11 is a perfect circle, the distance is not uniform), the weld bead FB can be cut well in the entire circumferential direction.

Also, in the embodiment, the rollers 425a, 425b, 426a, 426b are arranged at four locations, respectively, that surround the position where the cutting tool 441 is arranged, and the outer surfaces of the rollers 425a, 425b, 426a, 426b on the side facing the outer peripheral surface 11a of the liner 11 are positioned on the virtual plane extending along the extending direction of the rotation axis. Therefore, in the state where each of the rollers 425a, 425b, 426a, 426b is pressed against the outer peripheral surface 11a of the liner 11, the region in the outer peripheral surface 11a surrounded by the rollers 425a, 425b, 426a, 426b (the region on the outer peripheral surface 11a of the liner 11) becomes an almost flat surface extending along the extending direction of the rotation axis. This means that it is possible to cut the weld bead FB with the cutting tool 441 in the state where the weld bead FB projects from the outer peripheral surface 11a of the liner 11 that is formed into the flat surface. Thus, it is possible to cut the weld bead FB easily.

Modification 1

Figure 10:
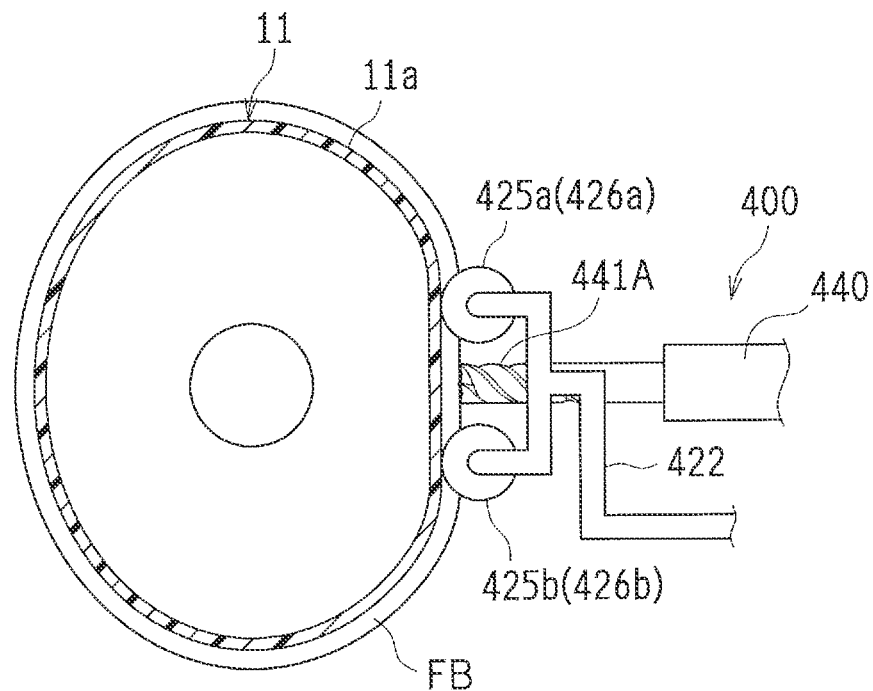
FIG. 10 is a view corresponding to FIG. 6 and shows a modification 1.

Next, a modification 1 is described. In the modification, a cutting tool 441 is different from that in the foregoing embodiment. The cutting tool 441 according to the embodiment is a tool bit. In this modification, as shown in FIG. 10 (a side view of a part of a cutting unit 400), an end mill 441A is employed as the cutting tool. Thus, a third slider 440 is provided with a rotor that is able to rotate around the horizontal axis (around the horizontal axis in the Y direction), and the end mill 441A is attached to the rotor. In a cutting operation of the weld bead FB, the weld bead FB is cut similarly to the forgoing embodiment while the end mill 441A is rotated.

Modification 2

Figure 11:
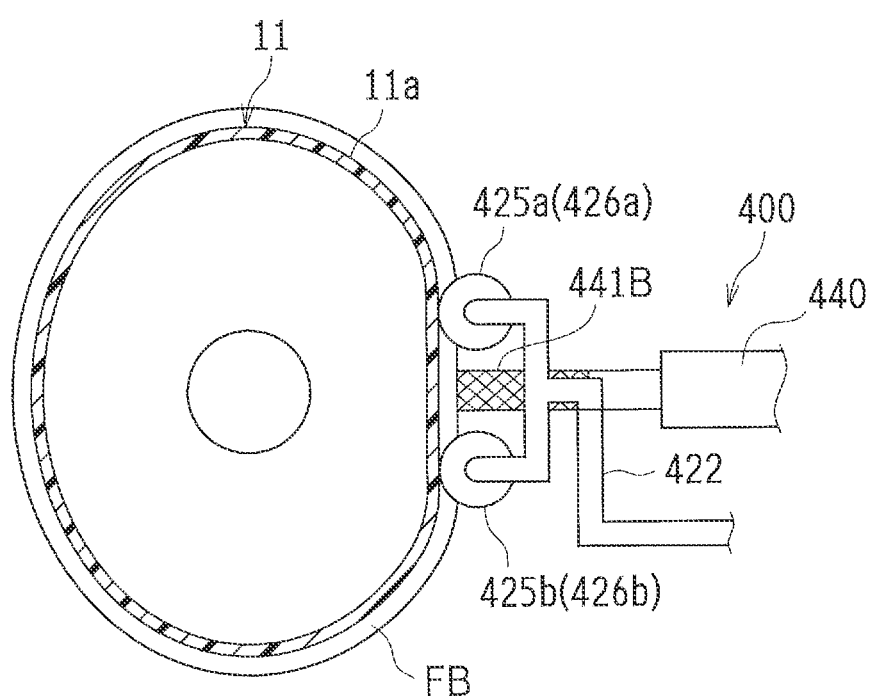
FIG. 11 is a view corresponding to FIG. 6 and shows a modification 2.

Next, a modification 2 is described. In this modification too, a cutting tool 441 is different from that of the foregoing embodiment. In this modification, as shown in FIG. 11 (a side view of a part of a cutting unit 400), a grinder 441B is employed as the cutting tool. Thus, a third slider 440 is provided with a rotor that is able to rotate around the horizontal axis (the horizontal axis in the Y direction), and the grinder 441B is attached to the rotor. In a cutting operation of a weld bead FB, the weld bead FB is cut similarly to the foregoing embodiment while the grinder 441B is rotated.

Other Embodiments

The disclosure is not limited to the foregoing embodiment and modifications, and all alterations and applications are possible within the scope of claims and its equivalent scope.

For example, in the foregoing embodiment and each of the modifications, the four rollers 425a, 425b, 426a, 426b are provided in the cutting unit 400. The disclosure is not limited to this, and one roller may be arranged on each of both sides of the cutting tool 441 (both sides in the X direction) and thus the two rollers in total are provided.

Alternatively, three or five rollers or more may be arranged around the cutting tool 441. Further, the rotors (the pressing rotors) that press the outer peripheral surface 11a of the liner 11 are not limited to the rollers 425a, 425b, 426a, 426b. Ball bearings may be employed, and outer races of the ball bearings may press the outer peripheral surface 11a of the liner 11.

Further, in the foregoing embodiment and each of the modifications, the weld bead cutting device 100 is described as an example, the weld bead cutting device 100 being for cutting the weld bead FB on the liner 11 that is made as the three resin molded articles (the liner portions 21, 22, 23) are joined to each other integrally. The disclosure is not limited to this, and is applicable to a weld bead cutting device for cutting a weld bead of a liner that is made as two resin molded articles are joined to each other integrally, or a liner that is made as four resin molded articles or more are joined to each other integrally. Further, the disclosure is also applicable to a weld bead cutting device for cutting a weld bead of a liner of a tank other than a hydrogen tank.

Also, in the foregoing embodiment and each of the modifications, the cutting tool 441 and the rollers 425a, 425b, 426a, 426b are able to reciprocate independently from each other. The disclosure is not limited to this, the cutting tool 441 and the rollers 425a, 425b, 426a, 426b may reciprocate integrally. In this case, a position of the distal end of the cutting tool 441 in the Y direction and a position of the outer peripheral surface of each of the rollers 425a, 425b, 426a, 426b in the Y direction (the outer peripheral surface on the liner 11 side) are set to be the same position in the Y direction. This means that the distal end of the cutting tool 441 is positioned on the foregoing virtual plane.

Furthermore, in the foregoing embodiment and each of the modifications, while the weld bead FB is being cut, the load control is performed so that pressing force of each of the rollers 425a, 425b, 426a, 426b onto the outer peripheral surface 11a of the liner 11 is maintained constant. The disclosure is not limited to this, and the weld bead FB may be cut with the cutting tool 441 in a state where positions of the rollers 425a, 425b, 426a, 426b are fixed (the distance L is maintained).

The disclosure is applicable to a weld bead cutting device and a weld bead cutting method by which a weld bead generated on an outer circumference of a weld portion of a resin liner is removed by cutting.

What is claimed is:

1. A weld bead cutting device configured to cut a weld bead generated on an outer circumference of a welding portion, the weld bead being generated when end edges of two resin members are abutted on and welded to each other, each of the end edges having a ring shape on an open side, the weld bead cutting device comprising:
    a rotation mechanism configured to rotate a workpiece formed as at least the two resin members are welded to each other, the workpiece being rotated around a rotation axis that extends along an abutting direction of the at least two resin members;
    a cutting tool arranged on an outer peripheral side of the workpiece and configured to cut the weld bead;
    at least two pressing rotors arranged on opposite sides of the cutting tool, the pressing rotors being configured to be pressed against an outer peripheral surface of the workpiece; and
    a reciprocation unit configured to hold the cutting tool and the pressing rotors and reciprocate the cutting tool and the pressing rotors relative to the workpiece along a direction orthogonal to the rotation axis, wherein the pressing rotors are arranged at four locations that surround a position where the cutting tool is arranged, and outer surfaces of the pressing rotors on a side facing the outer peripheral surface of the workpiece are positioned on a virtual plane extending in a same diretion as the rotation axis, wherein, the at least two pressing rotors are arranged on opposite sides of the cutting tool, so that, in a side view, a height positin at which the cutting tool is located is lower than a height position of an upper side of the at least two pressing rotors and the height position at which the cutting tool is located is higher than a height position of a lower side of the at least two pressing rotors.

2. The weld bead cutting device according to claim 1, wherein the pressing rotors are arranged at the four locations on the virtual plane that surround the position when the cutting tool is arranged, so that two of the four locations are at positions vertically higher than the cutting tool, and two of the of the four locations are at positions vertically lower than the cutting tool.

* * * * *